United States Patent
Otanez et al.

(10) Patent No.: US 9,008,921 B2
(45) Date of Patent: Apr. 14, 2015

(54) PRESSURE REGULATION METHOD FOR AN AUTOMATIC TRANSMISSION

(75) Inventors: Paul G. Otanez, Troy, MI (US); Zhen J. Zhang, Canton, MI (US); Ronald F. Lochocki, Jr., Ypsilanti, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 593 days.

(21) Appl. No.: 13/227,792

(22) Filed: Sep. 8, 2011

(65) Prior Publication Data

US 2012/0089306 A1 Apr. 12, 2012

Related U.S. Application Data

(60) Provisional application No. 61/391,354, filed on Oct. 8, 2010.

(51) Int. Cl.
*G06F 19/00* (2011.01)
*F16H 61/00* (2006.01)

(52) U.S. Cl.
CPC ......... *F16H 61/0021* (2013.01); *B60Y 2300/45* (2013.01); *F16H 2312/14* (2013.01)

(58) Field of Classification Search
USPC .............. 701/45, 51, 58, 60, 67, 54, 66, 68; 477/156, 143, 155, 154
See application file for complete search history.

(56) References Cited

U.S. PATENT DOCUMENTS

2002/0183164 A1* 12/2002 Katou et al. ............... 477/160
2009/0247355 A1* 10/2009 Tryon et al. ............... 477/52

* cited by examiner

*Primary Examiner* — Khoi Tran
*Assistant Examiner* — Adam Mott

(57) ABSTRACT

A transmission control system for a vehicle includes a transmission control module (TCM), a solenoid valve, a pressure regulator valve, and a transmission element. The TCM includes a control algorithm providing output signals to valve drive electronics, where the valve drive electronics supply current to the solenoid valve. The solenoid valve controls an output pressure located in a passage between the pressure regulator valve and the transmission element. During an engine start-up condition of the vehicle, the control algorithm of the TCM includes control logic for activating a solenoid adjustment algorithm. The solenoid adjustment algorithm decreases the sensitivity of the valve drive electronics when supplying current to the solenoid valve. The solenoid adjustment algorithm is activated for a predetermined amount of time after engine start-up, and is then terminated. Alternatively, the solenoid adjustment algorithm is activated until a vehicle operating condition reaches a particular value, and is then terminated.

19 Claims, 1 Drawing Sheet

PRESSURE REGULATION METHOD FOR AN AUTOMATIC TRANSMISSION

CROSS REFERENCE TO RELATED APPLICATION

Figure 1:
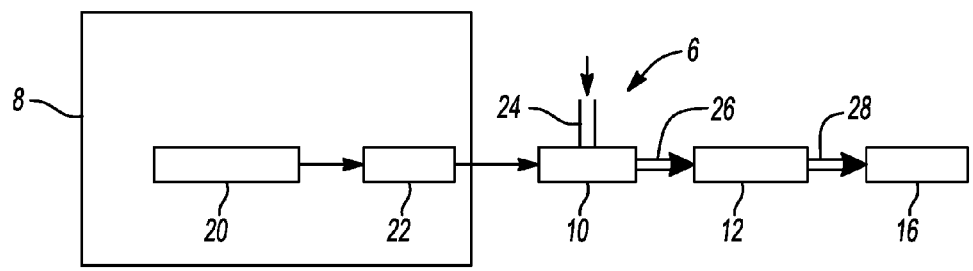

This application claims the benefit of U.S. Provisional Patent Application Ser. No. 61/391,354, filed Oct. 8, 2010, which is hereby incorporated in its entirety herein by reference.

FIELD

The present invention relates to electro-hydraulic controls for a power transmission, and more particularly to a pressure regulation algorithm for a power transmission.

BACKGROUND

The statements in this section merely provide background information related to the present disclosure and may or may not constitute prior art.

Automatic shifting motor vehicle transmissions include a hydraulic system, which provides power and controls operation of the various clutches, brakes and other elements within the transmission. The hydraulic pressure is limited or controlled in value to provide the most efficient operation that can be obtained.

In more recent transmissions, the hydraulic controls have been advanced to electro-hydraulic controls wherein electrical or electronic signals are available to assist transmission control. The electro-hydraulic controls generally comprise a solenoid valve, which receives various signals from a transmission control module (TCM) to supply a pressure signal to the various operating valves of the transmission. During an engine start event, there may be a marked increase or decrease in the pressure level of a passage that supplies fluid to the clutches. This increase or decrease results in an increase or reduction of torque capacity in the clutch. This change in torque capacity affects the vehicle launch performance. For example, a reduction in torque capacity increases the amount of time for the vehicle to reach a desired level of acceleration. Therefore, while current electro-hydraulic controls achieve their intended purpose, there is a need in the art for an electro-hydraulic control system that provides fluid to the clutches at a more constant pressure level.

SUMMARY

A method of pressure regulation in an automatic transmission is achieved by a transmission control system which includes a transmission control module (TCM), a solenoid valve, a pressure regulator valve, and a transmission element. The TCM includes a control algorithm providing output signals to valve drive electronics, where the valve drive electronics supply current to the solenoid valve. The solenoid valve controls an output pressure to the pressure regulator valve which outputs pressure to the transmission element. The control algorithm of the TCM includes control logic for activating a solenoid adjustment algorithm during an engine start-up condition of the vehicle. The solenoid adjustment algorithm decreases the sensitivity of the electro-hydraulic control system to engine transients. Such transients include, but are not limited to, engine start up conditions. The solenoid adjustment algorithm is activated for a predetermined amount of time after engine start-up when the output pressure in the passage is transient, and is then terminated. Alternatively, the solenoid adjustment algorithm is activated until a vehicle operating condition reaches a particular value, and is then terminated.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 2:
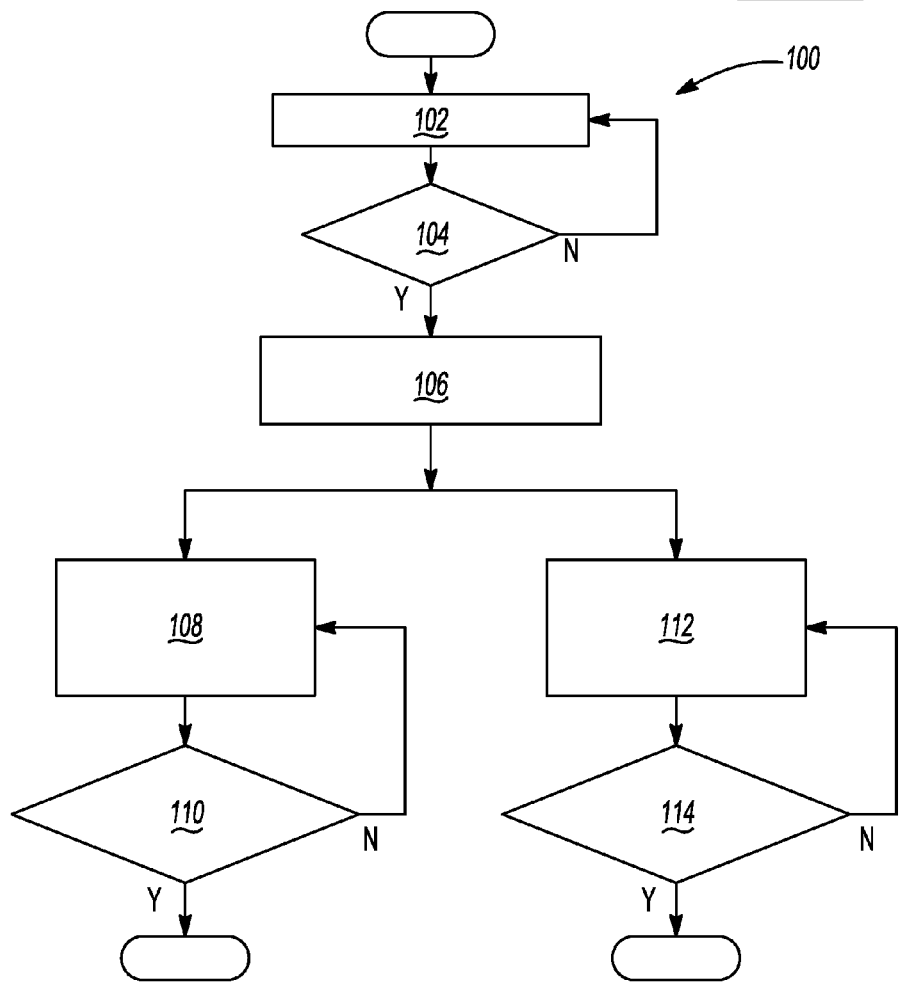

FIG. 1 is an exemplary diagrammatic representation of an electro-hydraulic control system incorporating the present invention; and FIG. 2 is a process flow diagram illustrating a method of operating the electro-hydraulic control system illustrated in FIG. 1.

DETAILED DESCRIPTION

The following description is merely exemplary in nature and is not intended to limit the present disclosure, application, or uses.

With reference to FIG. 1, a diagrammatic representation of a portion of a transmission control system 6 for a vehicle (not shown) is illustrated. In one embodiment, the transmission control system 6 incorporates a transmission control module (TCM) 8, a solenoid valve 10, a pressure regulator valve 12, and a transmission element 16. The solenoid valve 10 is preferably a variable bleed solenoid (VBS) that controls pressure proportionally or inversely proportionally to an electrical signal obtained from the TCM 8 although it may also be a variable force solenoid (VFS) or on/off solenoid. The pressure regulator valve 12 prevents hydraulic pressure to the transmission element 16 from increasing to an undesirable level, that is, above a predetermined value. The pressure regulator valve 12 may also ensure that hydraulic pressure to the transmission element 16 remains sufficient to provide a generally constant flow of hydraulic fluid. As noted above, the control system 6 may incorporate either the variable bleed solenoid valve 10 with the pressure regulator valve 12, a low flow variable force solenoid (VFS) valve 10 and the pressure regulator valve 12 or just the variable force solenoid (VFS) valve 10 without the pressure regulator valve 12. The transmission element 16 may be a conventional, selectively operable torque-transmitting mechanism such as a clutch or a brake for controlling the speed ratio within the transmission, a torque converter clutch for controlling the efficiency of a torque converter, or a system hydraulic pressure that hydraulically controls many aspects of the transmission operation.

The TCM 8 is an electronic control device having a preprogrammed digital computer or processor, control logic, memory used to store data, and at least one I/O peripheral. The control logic includes a solenoid valve hardware control algorithm 20 as well as a plurality of logic routines for monitoring, manipulating, and generating data. The TCM 8 is configured to provide a plurality of command signals such as throttle position, torque demand, vehicle speed, engine speed, and other characteristics or parameters of the powertrain. The solenoid valve hardware control algorithm 20 supplies output signals in electronic form to valve drive electronics 22. Specifically, the solenoid valve hardware control algorithm 20 instructs the valve drive electronics 22 to supply current to the solenoid valve 10. The valve drive electronics 22 issue signals to the solenoid valve 10, which in turn controls fluid pressure in a passage 26 to the pressure regulator valve 12. In one embodiment, the solenoid valve 10 and regulator valve 12 can be combined in a conventional low flow variable force solenoid (VFS) valve, as noted above. The pressure regulator valve 12 provides hydraulic fluid to the transmission element 16 through a passage 28. The pressure regulator valve 12 also regulates an output pressure in the passage 28, which is directed to the transmission element 16.

The solenoid valve control algorithm 20 of the TCM 8 calculates an electronic signal for the solenoid valve 10, which in turn provides pilot pressure to the pressure regulator valve 12. The pressure regulator valve 12, in turn, controls the output pressure in the passage 28 to the transmission element 16. Specifically, the valve drive electronics 22 of the TCM 8 supply the solenoid valve 10 with current to control the pilot pressure to the pressure regulator valve 12 and thus the output pressure of the pressure regulator valve 12 in the passage 28. The solenoid valve control algorithm 20 includes control logic for sending electronic signals to the valve drive electronics 22 for varying the output pressure in the passage 28. The output pressure is calculated based on operating conditions of the vehicle (not shown). Specifically, the output pressure in the passage 28 is based on whether the vehicle is operating in an engine start-up condition. The engine start-up condition indicates if an engine or other prime mover (not shown) of the vehicle has been restarted.

In one embodiment, the solenoid valve control algorithm 20 of the TCM 8 includes control logic for determining if an engine start-up condition has occurred by monitoring various vehicle operating conditions such as, for example, engine speed. In another embodiment, the solenoid valve control algorithm 20 of the TCM 8 monitors data signals from another control module (not shown) located in the vehicle. The data signals contain information indicating that engine start-up has occurred. For example, in one embodiment an engine control module (not shown) sends data signals to the TCM 8 indicating an engine start-up condition. If an engine start-up condition has occurred, then a solenoid adjustment algorithm included with the solenoid valve control algorithm 20 is activated. The solenoid adjustment algorithm considers the supply pressure variation 24 during engine start-up. Specifically, the solenoid adjustment algorithm decreases the sensitivity control of the valve drive electronics 22 when supplying current to the solenoid valve 10 such that if there is a marked increase or decrease of the supply pressure 24, the current supplied to the solenoid valve 10 will be adjusted proportionally to minimize the change in the output pressure in the passage 28. For example, if the supply pressure 24 experiences a marked increase of about 500 kPa in the time period of about half a second or less, the current supplied to the solenoid valve 10 would be adjusted accordingly if the solenoid adjustment algorithm is activated to minimize the change in output pressure in the passage 28.

In one embodiment, the solenoid adjustment algorithm is activated for a predetermined amount of time after engine start-up when the supply pressure 24 is transient, and is then terminated. In another embodiment, the solenoid adjustment algorithm is activated until at least an operating condition of the vehicle, such as prime mover (engine) speed or prime mover (engine) acceleration, is met, and then terminates. The solenoid adjustment algorithm eventually terminates because the decreased responsiveness to supply pressures of the solenoid valve 10 should only occur when the supply pressure 24 is at a transient and not during other operating conditions. Applying the solenoid adjustment algorithm beyond transients could result in undesirable disturbances being transferred to the transmission element 16 and to the remaining components of a driveline of the vehicle (not shown).

The solenoid adjustment algorithm is activated in an effort to maintain a generally constant fluid pressure in the transmission element 16. The solenoid adjustment algorithm is maintained for the predetermined amount of time or until an engine operating condition such as, for example, an engine speed or RPM $E_{speed}$ has attained a particular value. The predetermined amount of time is based on length of time the vehicle is at engine start-up conditions. In one embodiment, the variables that determine when the solenoid adjustment algorithm terminates include at least one of the engine speed $E_{speed}$, engine acceleration $E_{acc}$, and a time calibration constant $\tau$.

For example, in one embodiment, if the engine speed $E_{speed}$ is between approximately 100 and 800 RPM, then the control algorithm 20 of the TCM 8 maintains the solenoid adjustment algorithm. The engine acceleration $E_{acc}$ is the change in engine speed $E_{speed}$ over time. In one embodiment, if the engine acceleration $E_{acc}$ indicates that the engine is operating at crank speed, then the control algorithm 20 maintains the solenoid adjustment algorithm. The engine acceleration $E_{acc}$ can be computed using a number of different approaches. In one exemplary embodiment, the engine acceleration $E_{acc}$ is computed by a digital filter included with the solenoid valve control algorithm 20 of the TCM 8. The digital filter is any type of electronic system that performs calculations or mathematical operations on a sampled, discrete-time signal to determine certain aspects of the discrete-time signal. In yet another embodiment, the engine acceleration $E_{acc}$ is computed by a Kalman filter algorithm, which is also included with the solenoid valve control algorithm 20 of the TCM 8. The time calibration constant $\tau$ is a predefined value that represents an amount of time when the supply pressure of the passage 28 is in a transient state. The time calibration constant $\tau$ could be either a set value stored in the memory of the TCM 8, or is a learned value that is calculated using other vehicle operating parameters. In one embodiment, the time constant $\tau$ is approximately one second.

The solenoid adjustment algorithm is designed to reduce or eliminate a marked increase or decrease in the output pressure of the passage 28, decreasing the amount of time until the transmission element 16 is able to transfer torque. In one illustrative embodiment, implementing the solenoid adjustment algorithm will improve the transmission element 16 ability to transfer torque by about two hundred and fifty milliseconds. The solenoid adjustment algorithm reduces or eliminates a marked increase or decrease in the output pressure without the need to measure the output pressure of the passage 28 or the fluid pressure in the transmission element 16.

Turning now to FIG. 2, and with continued reference to FIG. 1, a method of controlling the solenoid valve 10 by the solenoid adjustment algorithm is generally indicated by the reference number 100. The method 100 begins at a step 102, where the solenoid valve control algorithm 20 of the TCM 8 includes control logic for monitoring vehicle operating conditions or another control module to determine if an engine start-up condition has occurred. In one embodiment, the solenoid valve control algorithm 20 includes control logic for monitoring various vehicle operating conditions such as, for example, engine speed. In another embodiment, the solenoid valve control algorithm 20 of the TCM 8 monitors data signals from another control module located in the vehicle. The method 100 then proceeds to a step 104.

In the step 104, the solenoid valve control algorithm 20 of the TCM 8 determines if engine start-up has occurred. The engine start-up condition indicates if an engine or other prime mover of the vehicle has been restarted. If engine start-up has not occurred, the method 100 returns to the step 102. If engine start-up has occurred, then the method 100 continues to a step 106.

In the step 106, the solenoid valve control algorithm 20 of the TCM 8 includes control logic for activating the solenoid adjustment algorithm. The solenoid adjustment algorithm decreases the sensitivity control of the valve drive electronics 22 when supplying current to the solenoid valve 10 such that if there is a marked increase or decrease in the supply pressure 24, the current supplied to the solenoid valve 10 will be adjusted proportionally to the change in the pressure in the passage 26. The method 100 may then proceed to either a step 108 or a step 112. Specifically, if the solenoid adjustment algorithm is activated for a predetermined amount of time after engine start-up, then the step 108 is selected. Alternatively, if the solenoid adjustment algorithm is activated until a vehicle operating condition is met, then the step 112 is selected.

In the step 108, the solenoid adjustment algorithm is maintained for the predetermined amount of time. As discussed above, the predetermined amount of time is based on the length of time the vehicle is at engine start-up conditions. The variables that determine the predetermined amount of time include may include at least one of an engine speed or RPM $E_{speed}$, engine acceleration $E_{acc}$, and a time calibration constant $\tau$. The method 100 may then proceed to a step 110.

In the step 110, the solenoid valve control algorithm 20 of the TCM 8 includes control logic for determining if the predetermined amount of time has lapsed. If the predetermined amount of time has not lapsed, then the method 100 returns to the step 108, where the solenoid adjustment algorithm continues to be maintained. If the predetermined amount of time has lapsed, then the method 100 may terminate.

In the alternative, if the method 100 selects the step 112, the solenoid valve control algorithm 20 of the TCM 8 monitors at least one operating condition of the vehicle. For example, in one embodiment the engine operating conditions include at least one of engine speed $E_{speed}$ or engine acceleration $E_{acc}$. The method 100 may then proceed to a step 114.

In the step 114, the control algorithm 20 of the TCM 8 continues to monitor the at least one operating condition until the operating condition is met, or reaches a particular value. For example, in one embodiment, if the engine speed $E_{speed}$ is less than 800 RPM, then the solenoid valve control algorithm 20 of the TCM 8 maintains the solenoid adjustment algorithm. Once the engine speed $E_{speed}$ exceeds 800 RPM, then the solenoid valve control algorithm 20 of the TCM 8 terminates the solenoid adjustment algorithm. The method 100 may then terminate.

The description of the invention is merely exemplary in nature and variations that do not depart from the gist of the invention are intended to be within the scope of the invention. Such variations are not to be regarded as a departure from the spirit and scope of the invention.

What is claimed is:

1. A method of regulating hydraulic pressure in a vehicular automatic transmission driven by a prime mover, comprising the steps of:
    providing a transmission control module having control logic for detecting operation of such prime mover, a solenoid valve control algorithm having a first sensitivity and a solenoid valve sensitivity adjustment algorithm,
    providing a modulating solenoid valve controlled by said transmission control module,
    detecting whether such prime mover has been started,
    decreasing said first sensitivity of said solenoid valve control algorithm to a second sensitivity by activating said solenoid valve sensitivity adjustment algorithm when such prime mover has been started,
    maintaining operation of said solenoid valve sensitivity adjustment algorithm for a predetermined period of time, and
    terminating operation of said solenoid valve sensitivity adjustment algorithm after said predetermined period of time.

2. The method of claim 1 wherein said solenoid valve adjustment algorithm controls said modulating solenoid valve providing hydraulic fluid to a transmission element.

3. The method of claim 1 wherein said solenoid valve sensitivity adjustment algorithm decreases sensitivity of an electro-hydraulic control system.

4. The method of claim 1 wherein said detecting of such starting of such prime mover is achieved by a sensor.

5. The method of claim 1 further including the step of returning control of a solenoid valve to a transmission control module upon termination of said solenoid valve adjustment algorithm.

6. The method of claim 1 wherein said transmission control module further includes control logic for determining a predetermined period of time.

7. A method of regulating hydraulic pressure in a vehicular automatic transmission driven by a prime mover, comprising the steps of:
    providing a transmission control module having control logic for detecting an operating condition of one of such prime mover and automatic transmission, a solenoid valve control algorithm and a solenoid valve sensitivity adjustment algorithm,
    providing a modulating solenoid valve controlled by said transmission control module,
    detecting whether such prime mover has been started,
    decreasing said first sensitivity of said solenoid valve control algorithm to a second sensitivity by activating said solenoid valve sensitivity adjustment algorithm when such prime mover has been started,
    monitoring said operating condition of such prime mover and automatic transmission, and
    terminating operation of said solenoid valve adjustment algorithm after said operating condition has achieved a particular value.

8. The method of claim 7 wherein said solenoid valve sensitivity adjustment algorithm decreases sensitivity of solenoid valve drive circuitry for said modulating solenoid valve which provides hydraulic fluid to a transmission element.

9. The method of claim 7 wherein said solenoid valve adjustment algorithm controls a current supply to said adjustable solenoid valve.

10. The method of claim 7 wherein said detecting of such starting of such prime mover is achieved by a sensor.

11. The method of claim 7 further including the step of returning control of said adjustable solenoid valve to said solenoid valve control algorithm of said transmission control module upon termination of said solenoid valve adjustment algorithm.

12. The method of claim 7 wherein said operating condition is one of time, an engine speed threshold and an engine acceleration.

13. The method of claim 7 wherein said transmission control module further includes control logic for detecting operation of such prime mover.

14. A method of regulating hydraulic pressure in an automatic transmission driven by a prime mover, comprising the steps of:
- providing a transmission having a modulating solenoid valve, a pressure regulator and a transmission element,
- providing a transmission control module including a solenoid valve control algorithm and a solenoid valve sensitivity adjustment algorithm,
- providing data to said transmission control module regarding whether such prime mover has been started,
- decreasing said first sensitivity of said solenoid valve control algorithm to a second sensitivity by activating said solenoid valve sensitivity adjustment algorithm when such prime mover has been started,
- maintaining said solenoid sensitivity adjustment algorithm until a predetermined condition has been met, and
- terminating said solenoid valve sensitivity adjustment algorithm after said predetermined condition has been met.

15. The method of regulating hydraulic pressure in an automatic transmission of claim 14 wherein said predetermined condition is one of a passage of a period of time, attainment of an engine speed threshold, and an engine acceleration threshold.

16. The method of regulating hydraulic pressure in an automatic transmission of claim 14 wherein said predetermined condition is an operating parameter achieving a particular value.

17. The method of regulating hydraulic pressure in an automatic transmission of claim 14 wherein said solenoid valve sensitivity adjustment algorithm controls a current supply to said modulating solenoid valve.

18. The method of regulating hydraulic pressure in an automatic transmission of claim 14 wherein said step of providing data regarding whether such prime mover has been started is achieved by a sensor.

19. The method of regulating hydraulic pressure in an automatic transmission of claim 14 further including the step of returning control of said modulating solenoid valve to said solenoid valve control algorithm of said transmission control module upon termination of said solenoid valve sensitivity adjustment algorithm.

* * * * *